United States Patent [19]

Gustafsson et al.

[11] Patent Number: 5,024,703

[45] Date of Patent: Jun. 18, 1991

[54] METHOD FOR THE PRODUCTION OF A COMPOUND FOR INCREASING OF FROST-RESISTANCE OF HARDENED CONCRETE AND THE COMPOUND THUS PRODUCED

[75] Inventors: Gert-Ove Gustafsson, Billdal; Leif Berntsson, Göteborg; Kåre Larsson, Bjärred, all of Sweden

[73] Assignee: Multistructure Sweden AB, Goteborg, Sweden

[21] Appl. No.: 382,241

[22] Filed: Jul. 19, 1989

[30] Foreign Application Priority Data

Nov. 12, 1984 [SE] Sweden ............................ 8405646

[51] Int. Cl.$^5$ .................... C04B 22/08; C04B 22/14; C04B 22/12
[52] U.S. Cl. .................................... 106/649; 106/672; 106/677
[58] Field of Search ................. 106/314, 91, 649, 674, 106/677, 731

[56] References Cited

U.S. PATENT DOCUMENTS

| | | | |
|---|---|---|---|
| 1,854,702 | 4/1932 | Laucks et al. | 106/91 |
| 2,110,053 | 3/1938 | Phillips | 106/91 |
| 2,521,073 | 9/1950 | Ludwig | 106/91 |
| 3,131,074 | 4/1964 | Thompson | 106/91 |
| 3,972,723 | 8/1976 | Ballé et al. | 106/90 |
| 4,556,426 | 12/1985 | Chesney, Jr. et al. | 106/90 |
| 4,948,429 | 8/1990 | Arfaei | 106/659 |

FOREIGN PATENT DOCUMENTS 0181849 5/1986 European Pat. Off. .

*Primary Examiner*—William R. Dixon, Jr.
*Assistant Examiner*—Sue Hollenbeck

[57] ABSTRACT

Compound intended to be added to concrete mass for entraining air in the concrete, thus increasing frost-resistance of the hardened concrete. The compound consists of: cereal storage proteins from wheat, triticale, barley or rye; a reducing agent preferably in the form of $FeSO_4$ in an amount adapted to the original properties of the cereal storage proteins to entrain air in the concrete mass during its mixing; an inert substance, preferably Portland cement or mineral powder in an amount adapted to the original capacity of the cereal storage proteins to entrain air in the concrete. By means of the reducing agent and the inert substance the compound is normalized to its effect to entrain air in the concrete irrespective of said original properties and capacity of the cereal storage proteins to entrain air in the concrete. A method to produce the compound includes testing of said properties and capacity in order to adapt the amount of reducing agent and inert substance to the original air entraining effect of the cereal storage proteins used for the respective produced batch of the compound.

8 Claims, 3 Drawing Sheets

METHOD FOR THE PRODUCTION OF A COMPOUND FOR INCREASING OF FROST-RESISTANCE OF HARDENED CONCRETE AND THE COMPOUND THUS PRODUCED

The present invention relates to a compound for increasing frost-resistance of hardened concrete and to a method for the production of the compound. More specifically defined, the invention relates to imparting increased climate resistance to concrete, particularly to frost-cracking, by use of admixtures to the concrete mix, these admixtures prepared to form the compound.

BACKGROUND OF THE INVENTION

Admixtures for concrete are used in order to increase the strength of the concrete and include additive types for entraining air in concrete; or for water reduction; or plasticizing admixtures or dispersion agents. To the last mentioned group are also counted plasticizing agents and superplastiziers or liquidizing agents.

Air is entrained in the liquid mass as a result of the mixing of the fresh concrete irrespective of the presence of an air pore forming agent. By stirring, air is drawn into the material when it is moving from the periphery of the mixer towards the center. As a result of the whirling motions of the mixer, turbulence in the mass causes air to be entrained at the surfaces where shearing occurs, causing enclosure and entrainment. The forming, dispersion and stabilization of the air pores is a fundamental process in the forming of emulsions in general.

On the other hand, by intense stirring and especially when turbulence occurs, some small desireable pores will coalesce so that larger pores or voids will be formed. Such a coalescence is natural as it provides a reduction of the surfaces and is directed towards decreasing of the free energy in the system.

The principal function of air-entraining agents is to hinder coalescence during mixing, transport, wetting and consolidation. This can be obtained if the walls of the pores, by adsorption of this agent at the air-water interface, form a deformable film with a polar surface, sometimes with an electrostatic charge, towards water. The air pore stabilizing mechanism is based on the fact that the molecules of air pore-forming agents have separated hydrophilic and hydrophobic portions. They are thus surface-active substances, which will be adsorbed at the air-water interface with the hydrophobic portion directed inwards towards the air, and the hydrophilic portion adsorbed in the water surface. Such an interfacial film will lower the surface tension of the water. By this effect large air pores can be sub-divided into smaller pores by the shearing action of mixing.

However, the diffusion of air from the pores at the water surface also has an importance for the distribution and control of pore dimensions in the pore system. The air pressure within the pores is reciprocally proportional to the pore diameter. The smaller the diameter, the higher the air pressure inside the pores. As higher pressure causes an increased concentration difference, the diffusion velocity is increased, whereby small pores disappear rapidly and larger pores increase in dimension. This diffusion effect results in a coarser air pore system. This will reduce the frost-resistance of the hardened concrete.

Frost-cracking resistance of concrete is usually based on the determination of the "spacing factor". This in general, is a term for the closest distance from a point in the solid material to the nearest pore surface.

Upon freezing, water increases about nine per cent in volume. If there are insufficient air pores of at least equal volume to the increased volume of the water upon freezing, the water can crack the concrete by the formation of ice. Upon freezing, the water expands in narrow capillary channels in the concrete matrix. The pressure of the water increases according to the distance to the surface of the air pores and if this distance is too large, the concrete will crack. This spacing factor, for a constant volume of the air pores, will be smaller, when the dimension of the air pores is smaller.

It is also important to have the total air pore volume as small as possible. In general an increase of the air pore volume by one per cent will cause a decrease of the compressive strength by about five per cent. It is therefore of great importance to obtain a stable air pore system with the smallest possible pore volume. The result will be the lowest, least possible reduction of strength of the concrete.

The capillary water suction and the risk of reaching the critical degree of water saturation is decreased by introducing an air pore system. The transport area for the water between the air pores will be decreased and the transport distance will be increased.

By introducing air pores, a further, important effect will result in modification of the structural formation of the material between the air pores. The water concentration is higher in the layer nearest to the pore wall than at a distance from the pore in the concrete. By hardening of the matrix between the air pores, the concrete will be stronger. The lower porosity gives a lower capillary absorption velocity as the capillary channels have smaller dimensions. This is a further contributing factor to slowing capillary suction rates, especially in systems with smaller air pores.

The existence of an air pore system which is optimal in its geometrical structure is necessary but is often not sufficient to reach good frost-resistance properties. Air pore systems with pore walls, that are not water repelling, will not give the concrete as high resistance against frost-cracking as an air pore system with pore walls that are hydrophobic. The function of air pore-forming agents will result in an orientation of the hydrophobic ends of the molecules towards the air-phase within the pores. When the hydration has started, the surface of the air pore can more or less be covered by hydration products which are hydrophilic. Macro-molecular surface-active substances and polymer particles can retain a part of the hydrophobic character without reduction of the same by the hydration products contrary to small surface-active molecules, for example metal soap molecules. Our invention has in that respect unique properties, so that the wall of the air pores remain hydrophobic after hydration of the cement.

It is well known that concrete which contains sand with particles smaller than 0.125 mm and with a marked low content of particles in the range 0.2–0.6 mm will have a pore system which is not effective against frost-cracking. In such cases it is not possible to obtain a sufficient air pore volume and the desired size distribution of the pores. Better results are obtained when the filler part is replaced by particles of the 0.2–0.6 mm fraction.

The group of substances on which the present invention is based are certain water-insoluble, high-molecular weight cereal storage proteins as the main admixture in controlled entraining of air in concrete.

In U.S. Pat. No. 2,521,073, Ludwig et al, it is suggested to use a number of proteins containing materials, among them wheat flour as an admixture to Portland cement. Also the use of gluten derived from wheat flour is suggested as an air-entraining agent for light weight concrete. It is obvious that the possibilities in the hardened concrete and particularly the ability of frost-resistance performance of gluten with combined flow properties, were not realized by Ludwig et al.

These cereal storage proteins have unique surface active chemical qualities. The best known example of these proteins is gluten from wheat, which gives a gel with water. These substances eliminates many of the disadvantages of other used pore-forming agents. By entrapping air during the mixing procedure, it does not matter which fraction size of the aggregate particles in the mix or concrete is chosen. This is demonstrated by mixing cement paste only, i.e. cement and water, with the proposed admixture. An air pore system of predetermined volume and the correct pore size distribution is obtained. Utilizing the same mixer, the same desireable airpore system is not obtained if other, prior art air pore agents are used instead. Further, the air pore-forming agent stabilizes the air pores and fixes the pores in the cement paste, by strengthening of the pore walls due to film formation and by preventing air diffusion between the pores.

Even if gluten has superior properties compared to other, air pore forming agents, such as derivates from petroleum products, there are no reports of large-scale use of gluten. The reason is certainly that gluten as a biological material has variable properties depending on variations in the genetic species used for the production of the corresponding wheat. There are also variations due to climate and the earth. The influence of these factors on the properties of the gluten results, as we have observed, in large variations in the properties of the concrete. Thus we lack reproducibility, which can not be accepted in industrial use.

The object of the invention is to eliminate the mentioned disadvantages connected to the prior use of gluten as an air-entraining agent by providing a method for the production of a compound usable by the production of frost-resistance of concrete so that the same will have a reproducable effect and will give controlable properties to the concrete, and that predetermined properties can be obtained with good accuracy in industrial scale production.

A further object is to provide a method to produce an on cereal storage proteins compound working as an air-entraining agent by concrete production which compound as an admixture is compatible with super-plastizers without disadvantageous effects as by prior art admixtures.

THE INVENTION

These objects of the present invention are obtained by means of a compound containing cereal storage proteins as air-entraining agent in concrete, the compound being produced by a preparation process according to the invention and described in the following.

It shall be pointed out here that the invention relates to hardened concrete, consequently concrete with a compressive strength of at least 25–40 Mpa and a pore volume not exeding 8–10%. Light-weight concrete of a lower strength is not of primary interest by the invention. The invention is illustrated in diagrammes shown if FIGS. 1-3.

DETAILED DESCRIPTION

Figure 1:
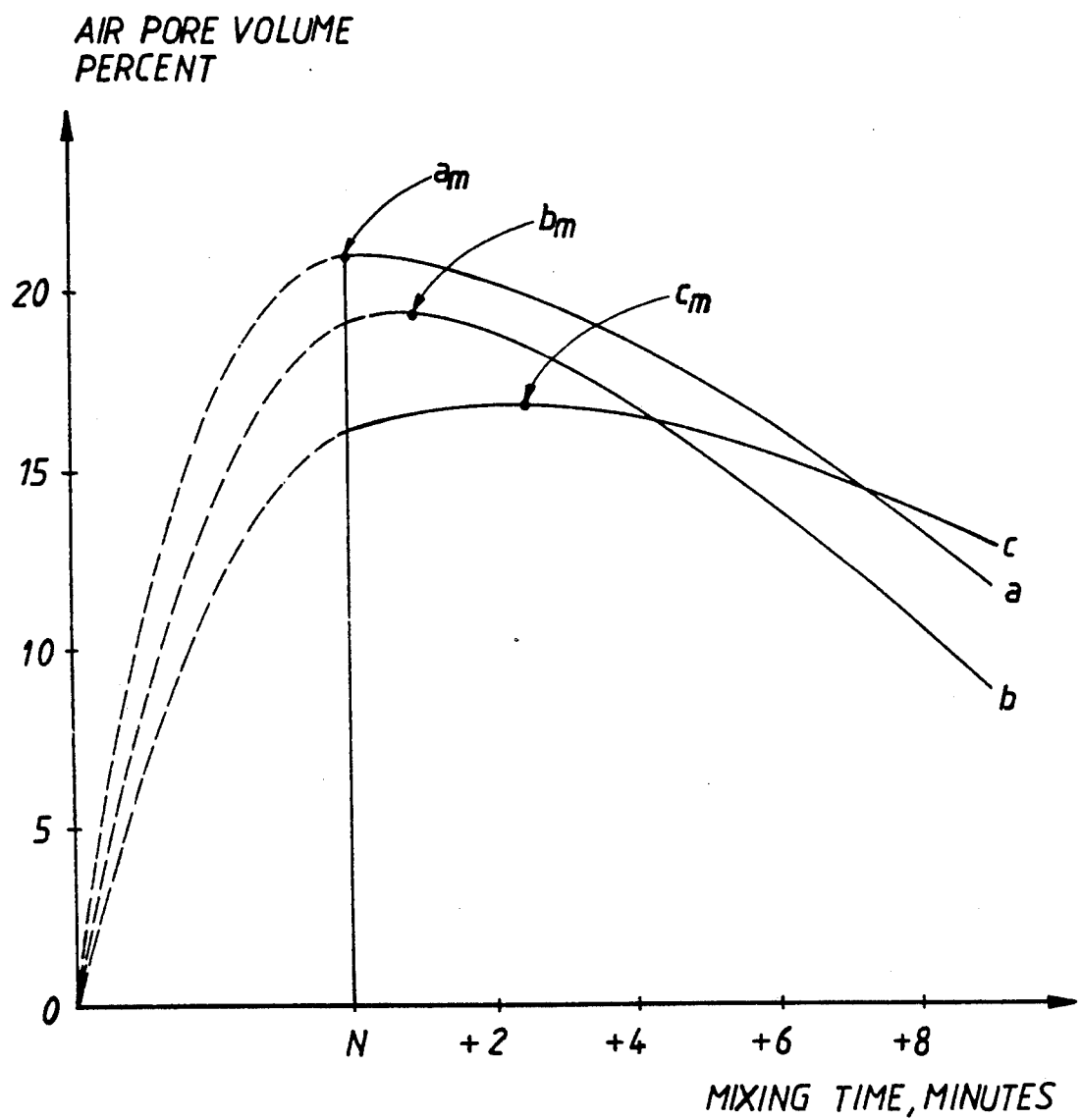

The admixture used for this invention is called compound in the following text. The basic material for the compound is gluten. The expression "gluten" is used for the basic material separated from different gluten sources as wheat, triticale, rye or barley. This material is obtainable in the market in different qualities depending the origin of the grain used and the methods utilized to produce the gluten. In the following the abbreviation C.S.P. (cereal storage protein) is adapted for the product produced according to said processes suggested to be used in connection with the invention and for gluten products of a comparable purity.

Eminent effects are obtained with wheat gluten as basic material, good results have also been shown in concrete with the use of gluten also from other cereals than wheat, particularly triticale and rye.

A. Production of C.S.P.

Two methods are below given as examples of suitable ways to produce C.S.P. useable in connection with the invention.

EXAMPLE A1

Separation of C.S.P. from triticale: A water suspension is prepared from triticale flour, milled like standard wheat flour, by 20 per cent (w/w) of triticale floor and 80 per cent (w/w) of water. This dispersion is homogenized by ultrasonification during a couple of hours. The dispersion is centrifugated for 20 minutes at 500 g (Alfa-Laval-centrifuge). The C.S.P. forms a layer between water layers at the top and a starch layer at the bottom in the centrifuge chamber. This C.S.P. layer is dried and grounded into a powder for use in the concrete preparation method.

EXAMPLE A2

C.S.P. obtained from wheat: Flour of wheat (AMY, Swedish Spring Wheat, 1975) is mixed in water at 10 per cent (w/w) of flour and 90 per ent (w/w) of water. The suspension is stirred in a standard mixing vessel by a propeller (about one turn a second) for half an hour. By centrifugation of the homogenized suspension in a standard industrial centrifuge (Alfa-Laval) the C.S.P. fraction forms a layer between water layers at the top and starch at the bottom of the centrifuge chamber. The C.S.P. is dried and then milled to a powder for further use.

By research made in connection with the present invention it has been shown that the presence of certain reducing metal ions together with C.S.P. in the concrete during the mixing process with water results in reduction of C.S.P.-crosslinkages by disulphide bridges. As origin of the metal ions, it is advantageous to use $FeSO_4$: (the Ferro sulphate salt.) This substance is cheap and harmless from a toxic point of view and is herefore suitable for practical, commercial use. Other ferro salts, such as $FeCl_2$, will provide the same reducing effect, but the sulphate was found to be ideal with regard to environmental factors. We have found that the addition of $FeSO_4$ to C.S.P. when preparing the compound, the performance of the same is improved in two important ways. First, as further is described below, it will be possible to produce a product with reproducable effect on concrete air pore entrainment in spite of biological variations of the protein pattern in the starting C.S.P.-product. The second factor of importance for the preparation process of air pore stabilized concrete is the addition of FeSO$_4$ makes the product less sensitive for variations in mixing time and in other mixing conditions. This is of particular importance in producing concrete in liquid form and in industrial scale.

Without Fe$^{2+}$ or another reducing substance the gel strength in water mixing will increase by formation of intramolecular disulphide bridges. The presence of Fe$^{2+}$ means that most sulphydryl groups will be unable to form disulphide bridges due to the redox potential introduced.

The desired effect of the addition of FeSO$_4$ or another substance as source for reduction is consequently to increase the plateau behaviour (FIG. 3) for the mixing time, i.e. increasing the time during which mixing can be continued without substantial influence on the air entraining in the concrete. In order to reach this effect it is necessary to add a certain minimun quantity of the reducing substance. On the other hand the proportion of the admixture should not be too high because it will lower the capacity of C.S.P. to entrained air in the concrete. When using FeSO$_4$ or a similar salt the proportion of sulphate in the concrete will increase. Above a certain level the sulphate will lower the quality of the concrete. A maximum content of sulphate in the concrete of 3.5 per cent has in some connections been established.

By means of testings made in connection with the developement of the present invention is has been shown that 0.5-5 per cent of FeSO$_4$ calculated on the amount of C.S.P. in the compound will give the desired effect. The C.S.P. in the concrete will not exceed 1 to 2 per cent of the binder in the concrete and consequently the sulphate percentage calculated on the binder will only be 0.0005, to 0.001 which will not have any measurable effect on the concrete.

In Table 1 it is shown that 1-5 per cent of FeSO$_4$ to the actual gluten used gives an acceptable plateau behaviour for the mixing time. The optimal effect will be reached by 2.5 per cent. At 10 per cent the air entraining is influenced in a disadvantages way. Consequently, by testing it is established that 2.5 per cent of FeSO$_4$ will give the optimum result and within the area 0.5-5 per cent the result will be acceptable. For other qualities of gluten different amount of FeSO$_4$ have to be used.

It is also possible to calculate the amount of the substance of the reducing agent needed by measuring the sheer stress relaxation versus time in the following way. This method can be used when the basic property of the C.S.P. used is not known and especially when another source of metal ion than FeSO$_4$ is used. After the calculation has been made it is to recommend to test the result on the mixing time plateau.

In order to standardize the gas-cell stabilizing effect of a particular batch of C.S.P. the following procedure is developed.

The gel strength is measured by shear stress relaxation versus time as described by Bohlin & Carlsson in Colloids and Surfaces vol. 2 (1981) page 59-69. Thus 0.35 g gluten dry powder was mixed with 0.65 g water. The gel was put in between cone (radius 1.5 cm and cone angle 84.6°). A shear amplitude of 1° of the gel gives a useful stress relaxation curve. By adding successively increasing amounts of F$^{2+}$, the time until the stress is reduced to half the original value (i.e. half relaxation time value) will decrease. For our purpose we found a value of 1.2 seconds of this half relaxation time to be a useful standard for our applications.

B. Modification of C.S.P. with FeSO$_4$

The proportion of FeSO$_4$ can, according to what have been mentioned before, be determined by means of testing. The tests made and presented in Table 1 show accordingly that the best and most reliable results in practice will be obtained if FeSO$_4$ is about 2.5 per cent of the weight of C.S.P. used.

EXAMPLE B1

The effect is shown by the graph for air pore volume as a function of mixing time (in minutes). By increasing the amount of FeSO$_4$ the air pore volume will increase even after longer mixing time. By further increasing the FeSO$_4$ the air pore volume will be lower again. The optimum amount of the reducing ions is the amount that gives the lowest mixing time to reach constant value of the air pore volume.

In another test a gluten commercially available from Raisio, Finland, was used. The test showed that 1.03 per cent (w/w) FeSO$_4$ used to the C.S.P. material would give the desired result. However, also an amount up to 5 per cent will give an acceptable result.

In certain cases and when other substances than FeSO$_4$ are used the following methods to determine the amount of substance to be added can be made according to Examples B2 and B3.

EXAMPLE B2

C.S.P. produced according to the described method A2 is used. In our rheological analysis we found that 1 per cent (w/w) of FeSO$_4$ (iron II sulphate) added to 99 per cent (w/w) of the dry C.S.P.-powder gave ideal properties of the concrete. In order to demonstrate the effect of the FeSO$_4$ modulation of the C.S.P. used we compared the behaviour of concrete mixtures based on the same C.S.P. without FeSO$_4$ added, compare Table 1.

EXAMPLE B 3

A gluten from Australia (Lundberg AB, Malmö, 1986/4) was used. The mixing analyzis described above showed that 1.7 per cent (w/w) FeSO$_4$ should be used. The C.S.P. was mixed with an equal weight amount of a 1.7 per cent (w/w) FeSO$_4$ solution in water. The resulting gel was dried in an oven at 110° C. The dry hard mass was ground (milled) and used in the concrete producing process.

By preparation according to example B1, 2 or 3 of the air entraining agent including not only C.S.P. but also FeSO$_4$ into C.S.P. the surface active properties of C.S.P. is maintained during the concrete making process. By adapting the amount of FeSO$_4$ to the basic properties of the C.S.P. of a certain batch by means of the methods described in said examples, it is in some extent possible to equalize the air pore forming properties of C.S.P. also if it derivates from different sources and in its untreated condition will give varying air pore forming results in the concrete mixing process.

The variation in the result refers two phenomenons, both relating to characteristics of the air pore forming system being produced at the end of the mixing process. The first phenomenon relates to the stability of the air pore forming system during the mixing. C.S.P. from different origins will give an increasing air pore volume up to a maximum value. The mixing time which is necessary for reaching this value can differ from one batch of C.S.P. to another. After the maximum value is reached further processing of the concrete mass in the mixer will decrease the air pore volume because of forming of disulphide bridges as has been described before.

The treatment of the C.S.P. in order to supply reducing metal ions to the same, preferably by adding ferro sulphate to C.S.P. as described in the examples will prolong the time during which the mixing process can go on without a substantial decrease in air pore volume.

This means that in the mixing process a so long mixing time can be used that the maximum air pore volume will be reached irrespective of the basic properties of the C.S.P used. If the mixing process will continue a further period of time after the end of the specified period for reaching the maximum value of each type of C.S.P. this will have no substancial influence on the end result. This fact is of great advantage in practice as it will be impossible in a mixing station to give each mixing batch exact the same degree of treatment. The degree of treatment depends not only on the mixing time but also other conditions as the speed of the mixer, the weight and art of the components and deposits in the mixer.

The first phenomenon is consequently the differences in the mixing time necessary to reach the maximum air pore volume. The importance of this phenomenon can, as have been described, be eliminated by eliminating the risk that the air pore volume will decrease if the mixing process will go on for a period time after that the maximum air pore volume is reached. Thereby a standardized minimum mixing time can be set which will be sufficient to reach the maximum value irrespective of the original properties of C.S.P. used.

The other phenomenon is the absolute air pore volume after a correct mixing procedure in which C.S.P. treated in the described way has been used. The preparation according to examples B1 or B2 will only give a prolonged period of time during which the mixing can continue but will have a limited influence on the absolute air pore volume resulting from the use of C.S.P. of different origins.

The object of the present invention is to provide a compound, which can be used as a standardized component of the concrete mix with a reproduceable effect. Consequently, irrespective of that variations in the original properties of the C.S.P. in those respects the producer of the concrete mass may relay on that the air pore volume should be the same from time to time if a certain, standardized receipt and treatment is used.

In FIG. 1 is shown the air pore volume in the hardened concrete as a result of mixing time and relating to three batches of C.S.P. a, b and c which have been added in the same proportion to the other components of the concrete mass. The C.S.P. of the different batches has different basic properties. The maximum values of the three batches are indicated $a_m$, $b_m$ and $c_m$. The test is made on standard mortar of 1:3 (cement: standard sand) in weight and with water cement ratio of 0.50. N is the standard mixing time, about 4 minutes.

Figure 2:
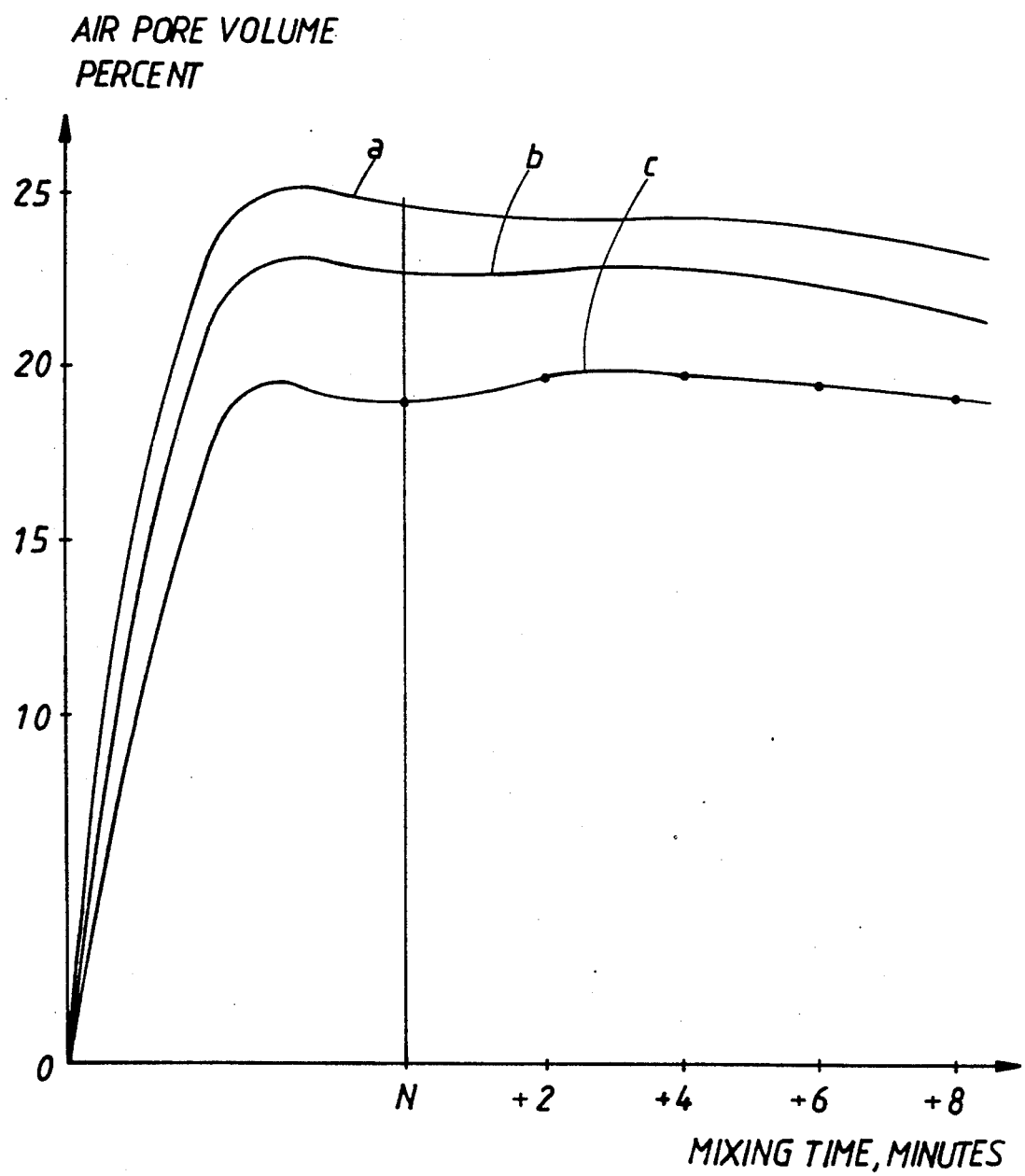

In FIG. 2 is shown how the mixing period, during which the maximum values a, b and c is maintained, is possible to be increased by treating the C.S.P. (compare Examples B1, B2). Consequently, a relatively long predetermined period N during which the mixing not may be interrupted, can be prescribed irrespective of which C.S.P. is used.

Figure 3:
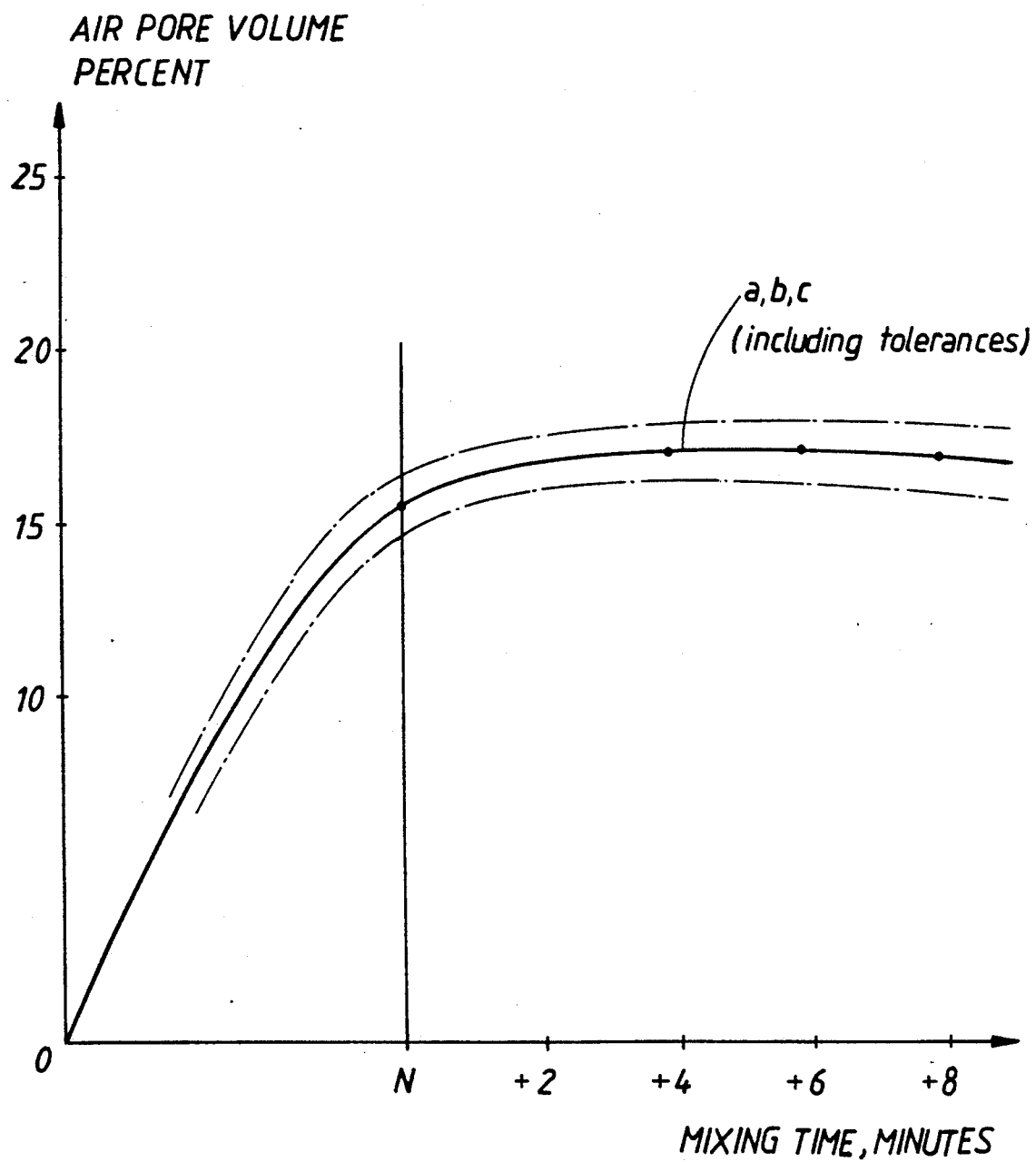

In FIG. 3 is shown the behaviour of the compound. Here are the curves a and b lowered to the same level c. This standardizing in the air pore forming effect is obtained by the same weight of the air pore forming component by blending the C.S.P. giving the air pore volumes a and b with an adapted amount of said inert substance.

Consequently, the compound based on C.S.P. can be proper to give a concrete not sensitive according to mixing time and corrected according to its capacity to form air pores. The compound is fully standardized and can be added in one and the same amount irrespective of the basic properties of the C.S.P. used. A standardized set of receipts for all kinds of concrete can be prepared.

C. Method of Characterizing the Air Pore Forming Properties of C.S.P. and Modification of that Properties In order to standardize the C.S.P. of different origins it first has to be tested according to its air pore forming capacity. A norm for this capacity was established in the following way:

Gluten available on the market was used. The gluten was then tested according to its air pore forming capacity. This will differ as mentioned above from batch to batch of gluten depending on the origin of the gluten. The lowest acceptable air pore forming capacity was given the number 100. Other gluten or C.S.P. with a higher capacity was given a lower number. For example the number 90 means that the C.S.P. in question has to be used, in an amount of 90 per cent by weight in order to reach an air pore volume equal to the volume obtained by means of 100 per cent by weight of a sample indicated 100. Consequently, 9 parts of C.S.P. indicated 90 has to be blended with 1 part inert material. Of a C.S.P. indicated 80.8 parts has to be blended with 2 parts inert material. The proportions of the parts have to be based on weight. The test of the air pore forming capacity was performed in the following way:

The capacity of the air pore forming properties of C.S.P., expressed by the volume of the air pore, is calculated from the measured density of fresh cement mortar. The mortar should have the composition 1:3 (cement: standarized sand by weight) and a water cement ratio of 0.50. The amount of C.S.P. added to the mortar is 0.07 per cent of the cement weight. The mortar is mixed in a standard mortar mixer. The density of the mortar is measured every two minutes after the first standarized mixing procedure is ended. Maximum mixing time should be 12 minutes. A graph expressing air pore volume as a function of time in minutes is drawn. The maximum air pore volume is noted. As an example the maximum air pore volume of 15% is reached after 4 minutes extra mixing after the standarized procedure. For another type of C.S.P. the maximum air pore volume may be probably of different value. If the added C.S.P. is of another amount, 0.05 per cent, the maximum air pore volume is proportional to the weight of C.S.P. added. The maximum value of the air pore volume is used to standardize the admixture by adding some suitable inert material to C.S.P. in order to get the same air pore volume in concrete for the same added amount of admixture in spite of different type of C.S.P. at the beginning.

EXAMPLE C1

A batch of gluten (Nordbahels, 1988) containing substance delivered for the production of the compound according to the invention was used for production of C.S.P. according to method A1. It is important that the amount of C.S.P. produced has the same properties all over.

The C.S.P. was then prepared with $FeSO_4$ according to the method B1, in order to make it less sensitive to mixing time in the concrete mixing process.

The C.S.P. prepared was tested according to its air pore forming capacity by means of the test described. The sample in question was given the number 85.

For each kg of the compound intended to be prepared 850 g of the C.S.P. was blended with 150 g inert material as for air pore forming properties, such as Portland cement.

By this method a fully standardized compound was produced. Its properties according to mixing time and air pore forming capacity is equal to the from time to time produced and delivered compound and can be used according to a set of standardized receipts in the concrete mixing process for different qualities of concrete.

EXAMPLE C2

The same procedure as by Example C1 was used but instead of Portland cement inert mineral powder such as Stone powder (grainded quarts) was used.

This composition can also be used for the production of the compound in liquid form (see the following examples D). The compound according Example C1 containing Portland cement can only be used when the compound has the form of a dry powder.

D. Preparing a Cement Mortar Mass of Portland Cement Including the Compound According to the Invention.

EXAMPLE D1

500 g standard Portland cement
500 g normal sand 0–0.5 mm
500 g normal sand 0.5–1 mm
500 g normal sand 1–2 mm
250 g water The amount of compound, see Tables 1, 2, 3 and 5.

The compound can be added to the other component of mass in different ways, dry or as a basic or acid dispersion.

a) The compound was weighted and mixed directly as a powder into the dry materials forming the mortar or concrete mass. The mixing is perfomed in a mixer which distributes the compound evenly among the other ingredients in the dry mixture. The compound can also be mixed into the binding agent, the cement or the cement mixed with other additives and admixture. After the dry mixing, the mixture can be distributed for further storing or packing, or water can be added, together with other admixture and then mixed to be ready for use.

b) The compound is added to prepared dry products as dry mix either before, at the same or after the adding of the water.

c) The compound is added during the mixing to the other chosen materials irrespective of whether the aggregate or other materials are dry or not. In most cases the aggregate contains a certain amount of water, i.e. the materials have in their normal state, a certain moisture content.

The dispersing of the powdered compound takes place when water is added to the cement and the pH-value increases.

d) The compound is stirred in water of about 10 per cent by weight to form a milky dispersion. This colloidal dispersion is added to the cement or to the concrete when the materials are filled into the mixer, at the same time, water is added and it may be injected into the water or mixed into the same or separately in the end of the mixing. In the last case it is important that the mixing be sufficiently maintained to ensure forming of the air pore system.

By dispersing the gluten contained in the compound in liquid it is found that the liquid is preferable not neutral but a liquid in which the pH-value is higher or lower than about 7 (neutral). The resulting liquid is either basic or acidic. In the following examples are shown how the dispersions are prepared. The cement paste, in itself, is basic and by using a basic liquid for the preparation a cooperation will consequently occur between the liquid and the concrete or mortar in this respect. If an acidic liquid is used, a certain neutralization occurs, resulting in formation of a salt. This salt has been shown to have certain plasticizing effects in the concrete, which can be of a value during some circumstances of use.

e) 20 per cent by weight of the compound is added to 80 per cent by weight ethyl alcohol (96 percentage). During stirring sodium hydroxide is added to form a solution of 10 per cent (w/w) in 90 per cent by weight of water. The final ratio between ethyl alcohol:sodium hydroxide solution will be 75:25 by weight. This means that the relations by weight, are such that the contained compound is 75 parts (16 per cent), water-ethyl alcohol (4:96) 300 parts (63 per cent) and water-sodium hydroxide (90:10) 100 parts (21 per cent). This dispersion of the compound is stable and can be utilized as a dispersion for storage or it can be added directly to the mortar or to the concrete. The adding can occur as described in under d. Stable storage dispersions are simple to dose with great accuracy. Because of the high pH in the dispersion, the surface-activity of the gluten is strengthened. By the now described preparing of the compound in liquid form with a basic pH it is not suitable to use $FeSO_4$ as the reducing agent. This substance will react with the sodium hydroxide. Instead $SnCl_2$ or $CuCl$ can be used.

f) Compound prepared from proteins from barley which is separated from the starch by a wet process whereby C.S.P. proteins bind about double their weight in water. After preparing the C.S.P. to form the compound acetic acid is added to form a gel so that the C.S.P. concentration will be 5 per cent by weight. The acetic acid concentration is 2 molar in the prepared dispersion.

To this dispersion which can be used as a liquid form of the compound can for storage be added with additives for preservation which will counteract decay of the organic substance e.g. a small amount ($\approx 0.1$ per cent) benzoic acid.

Also C.S.P. from other cereals than wheat can be used in the same way.

Different mixing times were used in a standard mortar mixer. N indicates the mixing time necessary to reach the obtainable air pore volume and was in this case about 4 minutes but can vary according to properties of C.S.P. used, aggregate (sand) and mixer.

The amount of C.S.P. contained in the compound was 0.5% of the binder (Portland cement). Different percentage of FeSO$_4$ was added to the C.S.P. according to the table below.

TABLE 1

Effect on the air pore volume in percent of the volume of mortar for different amount of FeSO$_4$, percentage (w/w) of C.S.P. (Gluten from Hungary/Engelhardt, Gothenburg, 1987:3), in the compound after different mixing times. 0.05 percent (w/w) of compound was added to Portland cement. Mortar 1:3, water cement ratio 0.50.

| Mixing time (Standard time (N) with x minutes added) | 0% | 1% | % FeSO$_4$ 2.5% Air pore volume | 5% | 10% |
|---|---|---|---|---|---|
| N | 11.5 | 14.0 | 14.1 | 12.2 | 8.2 |
| N + 2 | 14.6 | 16.7 | 16.8 | 14.8 | 8.3 |
| N + 4 | 15.0 | 15.9 | 16.9 | 14.4 | 10.5 |
| N + 6 | 14.2 | 15.3 | 16.6 | 13.4 | 12.4 |
| N + 8 | 13.0 | 14.2 | 16.4 | 11.7 | 14.8 |
| N + 10 | 11.7 | 13.0 | 16.0 | 10.6 | 16.2 |

In this table as well as in tables 2, 3 and 5, C.S.P. contained in the compound is present in a relative amount of 70–100 per cent (w/w) the rest being substancially the said inert substance added to normalize the air-entraining capacity of compound.

The table shows that an ideal content, 16–17 per cent of air pores, was obtained with as little as 0.05 per cent S-C.S.P. if 2.5 per cent FeSO$_4$ was added by its preparation. The content is very little depending on mixing time which is great importance in an industrial mixing process. Without preparation of C.S.P. with FeSO$_4$ the air pore volume will vary much more according to column two (0%) and depending on the mixing time.

Below is shown how the original properties of a C.S.P. is influenced in connection with its converting into the compound.

TABLE 2

The air pore volume (%) of mortar 1:3 and water cement ratio of 0.50 for different mixing times. Percentage FeSO$_4$ of compound = 2.5 (w/w). Percentage of Portland Cement of compound: 30 (w/w). Gluten from Hungary/Nordbakels, Gothenburg, 1988/3).

| Mixing time (Standard time (N) with x minutes added) | Original C.S.P. | C.S.P. prepared with FeSO$_4$ Air pore volume % | Diluted with Portland Cement = Compound |
|---|---|---|---|
| (N − 2) | 12.8 | 19.9 | 11.0 |
| N | 16.7 | 19.0 | 15.3 |
| N + 2 | 17.8 | 20.0 | 16.7 |
| N + 4 | 17.0 | 20.0 | 17.0 |
| N + 6 | 15.9 | 19.9 | 16.9 |
| N + 8 | 14.5 | 19.8 | 16.9 |

The result indicated in column three is shown also in FIG. 3.

The last column to the right refer to the standardized compound containing C.S.P. and FeSO$_4$ and adapted air pore forming capacity by dilution with inert material.

Below is a table showing the production of hardened concrete without special admixture. The result of the use of the compound is shown.

The compound was in powder form and was added to the other components, cement, aggregate, sand and stones, but without water. Mixing after adding of water was continued during 3 minutes.

| Content | |
|---|---|
| Cement | 400 kg/m$^3$ |
| Water cement ratio | 0.44 |
| Max. aggregate size | 16 mm |

TABLE 3

Some properties of fresh and hardened concrete with and without the compound.

| | Without Compound | With Compound added (0.055% w/w counted on cement) |
|---|---|---|
| Air pore volume (%) | 1.8 | 6.2 |
| Slump (mm) | 80 | 80 |
| Density (kg/m$^3$) | 2407 | 2303 |
| Compressive strength (MPa) | 60 | 50 |
| Shrinkage (°/$_{oo}$) | 0.25 | 0.27 |
| Scaling after 56 cycles freezing and thawing (kg/m$^2$) | 6.9 | 0.28 |
| Air bubbles: | | |
| Spec. surface (mm$^{-1}$) | — | 23 |
| Spacing factor (mm) | — | 0.17 |

By using admixture as liquidizing admixture superplastizer based on melamine or napthalene, the content of air pores was very little influenced compared to the values given in the table 1 as shown below

| | Content: | |
|---|---|---|
| Cement | 400 kg/m$^3$ | |
| Additives: | | |
| Type 1: | Compound, incl C.S.P. of cement | 0.05% (w/w) |
| | Superplastizising admixture provided for the decreasing of the Water-cement ratio: | 1.2% (w/w) |
| Type 2: | Compound, incl. C.S.P. | 0.04% |
| | Superplastizising admixture provided for lowering the viscosity | 0.5% |

TABLE 4

| | Mixing time 4 minutes | |
|---|---|---|
| | Type 1 | Type 2 |
| Water-cement ratio | 0.37 | 0.44 |
| Consistency Slump (mm) | 120 | 200 |
| Air pore volume (%) | 6.5 | 6.2 |
| Compressive strength 28 days (MPa) | 62 | 53 |
| Scaling, 56 cycles (kg/m$^2$) | 0.15 | 0.13 |
| Air bubbles | | |
| Spec. surface (mm$^{-1}$) | 40 | 30 |
| Spacing factor (mm) | 0.15 | 0.17 |

Porosity in mortar (air pore volume) obtained by means of different proportions of compound according to the following was:

TABLE 5

| Percent compound (dry weight) | Volume or air pores, percent |
|---|---|
| 0 | 3.0 |

TABLE 5-continued

| Percent compound (dry weight) | Volume or air pores, percent |
| --- | --- |
| 0.10 | 13.7 |
| 0.18 | 20.8 |
| 0.20 | 23.0 |
| 0.50 | 31.0 |
| 1.0 | 35.5 |
| 2.0 | 40.0 |

EXAMPLE D2

Testing data. Comparison were made with a constant amount of adding by varying water/cement ratios.

In the tests two different superplastizers were used. The amount of compound was 0.15 per cent of the cement weight and the mortar was 1:3 (cement:sand) in parts by weight. The sand had the same size distribution as that which was utilized in Example C1. The amount of superplastizer was 1 per cent dry weight based on the cement weight.

TABLE 6

| | Air pore volume in percent | | |
| --- | --- | --- | --- |
| Water cement ratio | 0-mixture, no admixture | Compound added | Compound + admixture 1 | Compound + admixture 2 |
| 0.30 | 14 | — | 10.7 | 16.3 |
| 0.35 | 5 | 10.3 | 10.5 | 19.0 |
| 0.40 | 4 | 15.7 | 14.0 | 20.0 |
| 0.45 | 4 | 18.4 | 17.0 | 21.8 |
| 0.50 | 4 | 22.0 | 19.5 | 21.7 |
| 0.55 | 4 | 25.0 | 19.7 | 21.5 |
| 0.60 | 4 | 25.2 | 19.3 | 20.8 |
| 0.65 | 3 | 25.3 | 19.0 | — |
| 0.70 | 1.5 | 25.0 | — | — |
| 0.75 | 0 | 24.8 | — | — |

Modulus of rupture compressive strength: related to cement-mortar 1:3, water/cement ratio=0.50 by different contents of air pores (S-C.S.P. amount); and ageing.
Dimension of the testing specimens: 40×40×160 mm

TABLE 7

| Air pore volume percent, testing age | Modulus of rupture (Mpa) | Compressive strength (Mpa) |
| --- | --- | --- |
| 3.0 (no admixture) | | |
| 1 day | 3.8 | 17.5 |
| 7 days | 7.2 | 38.5 |
| 28 days | 9.5 | 57.0 |
| 13.0 | | |
| 1 day | 2.4 | 7.5 |
| 7 days | 4.7 | 22.0 |
| 28 days | 6.3 | 32.5 |
| 23.0 | | |
| 1 day | 1.6 | 4.5 |
| 7 days | 3.3 | 13.0 |
| 28 days | 4.7 | 19.0 |

Studies of the structure in cement paste and cement mortar, by scanning electron microscope, has verified that the pore-dimensions and the distribution of pore-dimensions is in the range of 30–100 μm. Further, it indicated a stabilization mechanism of the air pores by means of a lamella structure at the surface of the air pores.

The expression "cement" used in the foregoing is used in its most extended meaning and includes beside Portland cement, types such as other hydraulic binders as high alumina cement, blended cement, slag cement, Portland cement added fly ash and silica fume, alkali-activated slags, plaster etc. Terms such as "cement mortar" "cement paste" and others have a corresponding broad significance.

In the foregoing it has been indicated that the object of the invention is to provide a compound which can be used in the building construction industry with a reproducable effect according to air-entraining in concrete in order to increase its frost-resistance. This means that the desirable air pore volume is 4–8 per cent of the volume of the concrete body produced. This percentage is reached with a compound amount containing said proportion of C.S.P. of less than 0.1 per cent of the binder (cement weight).

As is evident from table 5 40 per cent air pore volume could be produced; by an amount of 2 per cent of the compound.

Consequently the Compound according to the invention could be used also for the production of lightweight concrete, even if the main object relates to the production of frost resistant hardened concrete.

By production of hardened concrete with a compound content of less than 0.1 per cent, the Compound allows a mixing time varying within wide limits without substansial influence on the air pore volume.

By using a higher amount of compound by increasing the amount of the compound the air pore volume will increase with the mixing time. The amount has to be 2–20 times the percentage used by production of normal concrete, preferably 2–10 times.

The following results have been obtained with an amount of 0.15 per cent compound counted on the weight of cement.

TABLE 8

| Mixing time (minutes) | Air pore volume (%) |
| --- | --- |
| 1 | 3.0 |
| 2 | 5.5 |
| 3 | 8.0 |
| 4 | 10.0 |
| 5 | 11.7 |
| 6 | 12.2 |

It is consequently possible to adjust the air pore volume by adapting the mixing time. In this way the compound could have a use also by production of concrete with high air pore volume.

We claim:
1. A method for the production of a compound for increasing the frost-resistance of hardened concrete, the steps comprising;
   separating cereal storage proteins from wheat, triticale, barley or rye;
   determining an amount of reducing agents to be added to the cereal storage proteins based upon the physical properties of the cereal storage proteins to entrain air in the concrete mass during its mixing;
   adding reducing agents selected from the group consisting of ferro sulphate, tin chloride and copper chloride to the cereal storage proteins produced, in an amount of the reducing agents determined in said determining step;
   testing the capacity of the compound formed by the cereal storage proteins and the reducing agents to entrain air in the concrete mass during its mixing compared to a standardized air-entraining capacity; and adding a substance which is inert to air-entraining properties but which will dilute by weight percentage the air-entraining capacity of the compound.

2. The method according to claim 1 wherein $FeSO_4$ is added to the cereal storage proteins in an amount of 0.5-5.0 per cent by weight.

3. The method according to claim 1 wherein the compound is prepared in an acidic liquid dispersion comprising:
   1 weight part cereal storage proteins added with $FeSO_4$, 19 weight parts 2 molar acetic acid,
   0.001 weight parts benzoic acid of the cereal proteins and 0.03 weight parts of inert material of the weight of the cereal proteins.

4. The method according to claim 1 wherein the compound is prepared in an ethyl-alcoholic liquid dispersion wherein said ethyl alcoholic liquid dispersion has a basic pH and comprises;
   75 parts cereal storage proteins added with the reducing agents and the inert substance,
   300 weight parts water-ethyl alcohol solution the proportion of water to ethyl alcohol is 4:96,
   100 weight parts aqueous 10% NaOH solution
   and is prepared by mixing the cereal storage proteins added with $FeSO_4$ and said inert substance and the ethyl alcohol solution and then adding the resultant mixture to the sodium hydroxide solution.

5. Method according to claim 4 wherein the reducing agent used is $SnCl_2$.

6. Method according to claim 4 wherein the reducing agent used is CuCl.

7. A compound produced for increasing the frost resistance of hardened concrete, the compound consisting of;
   cereal storage proteins from wheat, triticale, barley or rye;
   reducing agents selected from the group consisting of $FeSO_4$, $SnCl_2$ and CuCl in an amount adapted to the physical properties of the cereal storage proteins to entrain air in the concrete mass during its mixing;
   inert substance, selected from the group consisting of Portland cement and mineral powder in an amount adapted to the original capacity of the cereal storage proteins to entrain air in the concrete;
   the amounts of reducing agents and inert substance added being so adapted that the mixing time of the concrete mass and the air entraining capacity are standardized irrespective of said physical properties and capacity to entrain air in the concrete.

8. A method for production of a compound for increasing the frost resistance of hardened mortar, steps comprising:
   separating cereal storage proteins from wheat, triticale, barley or rye;
   determining an amount of reducing agents to be added to the cereal storage proteins based upon the physical properties of the cereal storage proteins to entrain air in the mortar mass during its mixing;
   adding reducing agents selected from the group consisting of ferro sulphate, tin chloride, and copper chloride to this cereal storage proteins produced in amount of the reducing agent determined in said determining step;
   testing the capacity of the compounds formed by the proteins and the cereal storage proteins and the reducing agents to entrain air in the mortar mass during its mixing compared to the standardized air entraining capacity; and
   adding a substance which is inert to air entraining properties but which will dilute by weight percentage the air entraining capacity of the compound.

* * * * *